United States Patent [19]

Pacciarini et al.

[11] 4,288,265

[45] Sep. 8, 1981

[54] PROCESS AND APPARATUS FOR MANUFACTURING RADIAL TIRES

[75] Inventors: Antonio Pacciarini; Giorgio Bertoldo, both of Milan, Italy

[73] Assignee: Industrie Pirelli S.p.A., Milan, Italy

[21] Appl. No.: 76,743

[22] Filed: Sep. 18, 1979

[30] Foreign Application Priority Data

Oct. 25, 1978 [IT] Italy ............................... 29063 A/78

[51] Int. Cl.³ ........................................... B29H 17/20
[52] U.S. Cl. ................................ 156/126; 156/128 N; 156/416; 156/417; 152/361 R
[58] Field of Search .................. 152/361 R; 156/126, 156/127, 128 R, 128 N, 129, 405 R, 414–420

[56] References Cited

U.S. PATENT DOCUMENTS

| | | | |
|---|---|---|---|
| 3,151,013 | 9/1964 | Nebout | 156/126 |
| 3,219,510 | 11/1965 | Frazier | 156/127 |
| 3,374,131 | 3/1968 | Gough | 156/126 |
| 3,713,929 | 1/1973 | Bottasso et al. | 156/127 |
| 3,784,437 | 1/1974 | Appleby et al. | 156/415 |
| 3,925,141 | 12/1975 | Caretta | 156/128 R |
| 4,072,550 | 2/1978 | Stalter | 156/128 R |
| 4,131,402 | 12/1978 | Pirovano | 425/19 |

FOREIGN PATENT DOCUMENTS 1509606 5/1978 United Kingdom .

*Primary Examiner*—John E. Kittle
*Attorney, Agent, or Firm*—Stevens, Davis, Miller & Mosher

[57] ABSTRACT

A process is provided for manufacturing radial tires for a motor vehicle having a radial carcass, a reinforcing structure with at least two layers of criss-crossed symmetrically arranged metallic cords forming a belt, and a tread. The process involves a series of steps which comprise: building up a carcass in a cylindrical configuration on a first expandable building drum and shaping the carcass into a toroidal configuration. A reinforcing belt is also formed by winding two layers of metallic cords on an auxiliary expandable drum with a diameter equal to the external diameter of the toroidal shaped carcass. The belt is maintained in slidable contact on the drum and shaped toroidally by expanding the auxiliary drum. The belt is then removed from the auxiliary drum and transferred with a tread band to the carcass on the first drum. The carcass is toroidal shaped again to assemble the carcass and belt. The assembly is vulcanized under pressure in a mold.

25 Claims, 8 Drawing Figures

PROCESS AND APPARATUS FOR MANUFACTURING RADIAL TIRES

This invention relates to a process for manufacturing radial tires and to an apparatus for practicing the process. The radial tires comprise, from inside to outside, a carcass having one or more plies wherein the cords lie substantially in meridian planes; a ring-shaped reinforcing structure formed by at least two layers of metallic cords criss-crossed one with the other and oriented symmetrically with respect to the longitudinal direction of the tire; and a tread.

Generally speaking, these tires have been manufactured in accordance with prior art processes by disposing the carcass plies in a cylindrical configuration on a special expandable building drum, then bringing this first configuration of the carcass to a toroidal configuration, and finally, disposing onto this carcass the reinforcing structure and the tread band.

In the case of radial tires that have particular characteristics such as, for example, more comfortable and better handling, there exist other 'known' manufacturing processes as well.

In general, these processes consist in applying the annular reinforcing structure on the toroidal-shaped carcass that has already been built on a building drum through an expandable membrane, and subsequently, in taking the carcass, with its associated reinforcing structure, and in the absence of the tread, to a second toroidal shape by means of a further expansion of the drum membrane.

By this process owing to the fact that the cords are not obstructed in their movement by a tread band, a more uniform disposition of the metallic cords is achieved and, moreover, a state of tension is obtained in the cords that increases the tire's resistance against lateral and torsional stresses.

In particular, the various assembling operations, the centering and the reciprocal aligning of the various tire component parts onto the building drum, all require the use of a great number of devices around the drum itself. For example, the so-called 'bells' or equivalent supports are used for positioning the annular reinforcing structure onto the carcass, after the first toroidal shaping, and also for positioning the tread, after the second toroidal shaping of the carcass.

Consequently, all these manufacturing steps and the apparatus used in practicing them are very complex. Moreover, the various inspection, checking-up and other manual operations required are to a certain extent, obstructed by the presence of multiple machine parts, all located within a limited space around the building drum.

Moreover, it has been found also that the distribution and the uniformity obtained by the metallic cords of the reinforcing plies are not entirely satisfactory because the cords become arranged on the carcass with variations in the angle of inclination that are significant and undesirable in a radial tire which must be resistant to all kinds of stresses during its performance on a motor vehicle wheel.

It is an object of this invention to provide a process and apparatus for manufacturing radial tires which are devoid of the foregoing disadvantages. Another object of the invention is to provide an improved apparatus and process for making radial tires for motor vehicles.

Other objects will become apparent from the following description with reference to the accompanying drawing wherein FIG. 1 represents, in section, one embodiment of a radial tire manufactured by means of the process and apparatus of the invention;

FIG. 3 is a cross-section, in detail, of the main drum of the apparatus of FIG. 2 for manufacturing the tire carcass of FIG. 1;

FIG. 7 represents the main drum of FIG. 3, after the step of the first toroidal shaping of the carcass and around the drum, and the belt and the tread spaced apart from the drum;

FIG. 8 represents a tire after the second toroidal shaping of the carcass and after the stitching process.

Figure 1:
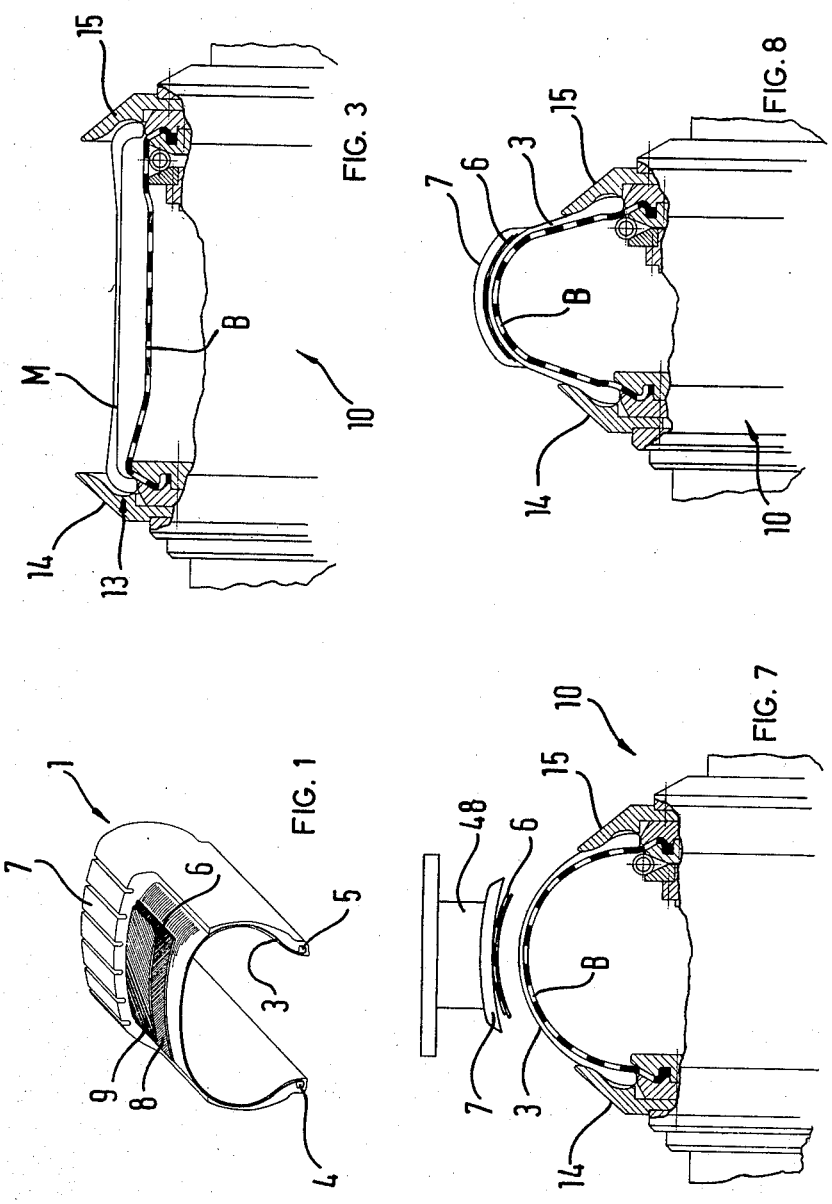

The foregoing objects and others are accomplished in accordance with this invention, generally speaking, by providing a process for manufacturing radial tires comprising a radial carcass, a reinforcing structure with at least two layers of metallic cords which constitute the belt, the cords of the two layers being criss-crossed with each other, and symmetrically oriented with respect to the longitudinal direction of the tire, and a tread, the process comprising the steps of:

(a) building-up the carcass in a cylindrical configuration on a main expandable building-drum;

(b) shaping the carcass, in its non-vulcanized state, into a toroidal configuration; the process being characterized by the fact of comprising the further steps of:

(c) disposing and winding into a cylindrical configuration, the belt (formed by two layers of metallic cords) on an auxiliary expandable drum with a diameter equal to the external diameter of the carcass, after the first toroidal configuration on the main building drum:

(d) expanding the expandable part of the auxiliary drum, and maintaining the expandable part and belt in slidable contact, and while in the slidable condition, taking the belt from its first cylindrical configuration to a toroidal configuration, with an equatorial development which is greater than the equatorial development of the carcass after the first shaping;

(e) contracting the auxiliary drum;

(f) extracting from the auxiliary drum, the annular layered-band comprising the belt and the tread which has been wound on the belt after step (d);

(g) transferring and centering the annular layered-band, in correspondence of the equatorial plane of the carcass on the main drum;

(h) expanding the main drum, and proceeding to make a second toroidal shaping of the carcass until taking the carcass crown into contact with the corresponding toroidal surface of the belt; and (i) vulcanizing the so-formed tire in a mold, and under pressure.

The fundamental characteristic of the invention involves expanding the belt, without the tread and the carcass, while taking care, at the same time, to exercise uniform pressures on a belt by means of an expandable surface with slidable characteristics that maintain, in the expansion step, a practically negligible friction when there is contact between the expandable part of the auxiliary drum and the elastomeric part of the overlying layer that contains the metallic cords.

This process can be carried out with an expandable part of the auxiliary drum formed out of a metallic material for example, with a plurality of sectors in steel or other metal having a surface with an anti-adhesive covering, that is preferably scored; or of any other material, the behavior of which is equivalent to that of a metal, as far as concerns 'frictional effects' when in contact with the belt to be expanded.

According to the process described above, the metallic cords of the reinforcing layer are more freely disposed and more uniformly layed than are cords prepared by the 'known' processes.

As a matter of fact, in the step of expanding the belt, the metallic cords are not obstructed in their movement of setting, due to the presence of the tread and to the underlying carcass—the elastomeric composition of which, in the processes of the prior art, originated a high friction when in contact with the elastomeric part of the belt, and which resisted hence, free expansion, causing negative results, such as preventing a uniform distribution of the cords.

The process of the invention, can also be applied among other things, to the manufacture of radial tires which comprise on the carcass (besides the belt with metallic cords), further reinforcing layers—for example, one of several layers of cords that are parallel to each other and disposed in a longitudinal direction. These cords can be either metallic, or a textile material which shrinks under the action of heat.

The manufacturing process for the tire with textile cords is characterized by the fact of applying and winding around the already expanded belt, at least one layer of textile material cords, and finally wrapping the tread—for constituting the annular layered band for being transferred to the main drum, where the carcass after its first toroidal shaping, has been made ready.

This process, moreover, brings about the advantage again, of manufacturing a tire possessing particular characteristics of comfort and uniform behavior because the metallic cords, not being impeded in their movements and by the presence of the textile cords (such as, for example nylon cords), are able to settle during belt expansion; this results in very small variations in the inclination angle.

A further object of the invention is to provide an auxiliary expandable drum for separately shaping the reinforcing structure and the tread for manufacturing radial tires comprising a tread, a radial carcass and a reinforcing structure which has at least two layers of metallic cords criss-crossed with each other and forming the belt, the carcass being produced on a main expandable drum where it is transformed from a cylindrical configuration into a first toroidal shape, and then, to a succeeding second toroidal shape for transforming the external equatorial development of the carcass into a higher value than that obtained during the first shaping; the auxiliary drum being characterized by comprising means for assuming and for passing from a cylindrical configuration into a toroidal configuration, in such a way as to transform the belt, wound onto the auxiliary drum which has a diameter corresponding to that of the first toroidal shaped carcass to the toroidal shaped configuration corresponding to the carcass crown of the second shaping, the said means comprising an expansible part in a metallic material, or material that is equivalent to metal as regards the 'frictional effects' during the contact between the expandable part and the belt, during the passage from a cylindrical configuration into a toroidal configuration.

In a preferred embodiment, the means for assuming and for making the auxiliary drum pass from a cylindrical configuration to a toroidal configuration comprises a plurality of supports disposed circumferentially and parallel to the drum axis, assembled with each other with interposed void spaces, a plurality of convexed sectors comprising the expandable part of the means with a total convexed surface disposed below the upper surface of the supports in the cylindrical configuration of the auxiliary drum, means for the passage of the sectors between the void spaces and for the expansion of the sectors up to a position above the supports for determining the toroidal configuration of the auxiliary drum. Still another object of the invention is to provide a plant or apparatus for manufacturing radial tires comprising a tread, a radial carcass, and a reinforcing structure of at least two layers of metallic cords criss-crossed one with the other, for forming the belt; the plant or apparatus comprising a main 'known' per se expandable drum—for converting the carcass from a cylindrical configuration to a first toroidal shape, and then to a subsequent toroidal shape having a higher value than the first shape, said auxiliary drum being adapted, as first stated, for assuming the configuration from cylindrical to toroidal and for taking the layer of metallic cords from a cylindrical configuration to a toroidal shaping of the carcass; means for transferring the annular layered-band that is comprised by the reinforcing structure and by the tread from said auxiliary drum onto said main drum, after the first toroidal shaping of the carcass, and prior to the second toroidal shaping of the same carcass.

In the description given below, reference is made to one embodiment of the tire of the invention illustrated in FIG. 1 and to one embodiment of the corresponding manufacturing plant illustrated in FIG. 2.

The illustrated 'finished' tire in the drawing has a single-ply radial carcass 3 having its extremities turned up around the beads 4 and 5, a reinforcing structure 6, and a tread 7.

The reinforcing structure 6, has an annular belt constituted by two layers, of rubberized canvas 8, 9, comprising metallic cords criss-crossed one with the other and inclined with respect to the equatorial plane at an angle equal, for example, to 21°.

Obviously, the reinforcing structure can have other reinforcing layers such as, for example, strips of nylon cords with a longitudinal direction that are omitted here without adversely effecting in any way comprehension of the invention. More generally speaking, the plant 2 for manufacturing tire 1, comprises a basic or main drum 10 for building first the carcass 3 in a cylindrical configuration and then transforming it into a first toroidal shape; an auxiliary expandable drum 11 for shaping the belt first into a cylindrical configuration with a diameter corresponding to the maximum diameter of the carcass in the first shaping step, and then for converting the belt into a toroidal shape; means 12 for transporting the annular layered-belt constituted by the reinforcing belt and the tread from the auxiliary drum to the main drum with the mid-plane of the annular layered-band corresponding to the mid-plane of the carcass of the first shaping step in such a way as to be able to proceed successively with the second toroidal shaping of the carcass, until when the carcass crown reaches, and is disposed against the corresponding internal surface of the belt.

The main drum 10 (see FIG. 3) is constituted by an expandable membrane 'B' and by device 13 for blocking the beads comprising two C-shaped rings 14 and 15 which are adapted for the purpose of fitting-on and for successively blocking the beads of the carcass' cylindrical sleeve 'M'—which modalities are amply described and illustrated in the Italian Pat. No. 957,079 and its corresponding U.S. Pat. No. 3,925,141, assigned to the assignee of this application.

The auxiliary expandable drum 11 (see FIG. 4) has means for allowing the carcass to assume a cylindrical configuration, and for passing from the cylindrical configuration to a toroidal one.

In the preferred embodiment, the means comprise a plurality of supports for the belt constituted by a cylindrical supporting structure 16 in the form of a comb with teeth 17, and an expandable part constituted by a plurality of sectors 18 having a convexed surface 19 disposed radially with the overall surface below the upper surface of the comb 16 in its initial at-rest position (see FIG. 4), and thence, shifted radially outwards, towards the toroidal configuration, through expansion means 20 (see FIG. 4) illustrated in detail in FIG. 6.

The comb-like structure carries out various functions as listed and explained below:

(a) With its external cylindrical development it acts as an element for measuring the length of the belt, the first cylindrical configuration of which (for the actual purpose of the invention), is required to have an external diameter corresponding to the maximum diameter of the carcass, after its first toroidal shaping.

(b) With its external comb-shaped development having teeth 17 preferably occupying half of the total cylindrical surface, it constitutes a practically continuous support for the uncured belt thereby obviating dangerous deformations; and, at the same time, owing to the presence of void spaces between comb-teeth, it permits expansion of the sectors in order to make the auxiliary drum assume the toroidal configuration after the cylindrical configuration.

(c) The practically continuous cylindrical external development allows overlapping of the belt edges through-out their entire length with the advantage of having a perfect joint which cannot be obtained, for example, if the layers of the belt are wound onto the convexed sectors for the surface obviously would only constitute a partial support for the width of the overlying layers and would render the relative junction of the edges imperfect.

(d) It acts as a centering element for the belt, for example, in providing a circular ridge 21 (see FIG. 4), defined by an orthogonal plane at the axis '1' of the auxiliary drum, against which one side 'L' of the belt is maintained, while the belt is wound onto the drum.

The plurality of the sectors 18, comprise a convexed surface 19 of metallic material—particularly in steel, or any other material that has "frictional effects" which are equivalent to a metal during contact between the surfaces of the sectors in expansion and the belt; or yet as another example, in polytetrafluoroethylene (known commercially as "Teflon"), that has special 'non-stick' characteristics, or in some such equivalent materials whose surfaces have duly undergone a special process for rendering them slidable, with respect to the belt.

Generally speaking, the surface of the sectors (regardless of what material they are made of) must have a minimum friction when contacting the belt in expansion, in such a way as to uniformly settle the metallic cords during their passage from the cylindrical conformation to the toroidal conformation of the belt.

The sectors 18 are designed to have a special form for permitting deep penetration of the convexed surface 19 between the teeth 17 of the comb 16, and into the void spaces found between the teeth, and hence, to be able to expand the belt with the greatest uniformity possible.

Each sector, with regard to this, comprises two longitudinal substantially identical wells 22 (see FIG. 5) having their form corresponding to that of the comb-teeth with each well having a depth (measured radially to the auxiliary drum between the innermost surface of the teeth and the bottom of the relative well in its at-rest position), at least equal to the radial shifting of the sectors, for passing from the initial position below the comb (see FIG. 4) to the upper position that is coincident with the toroidal configuration of the auxiliary drum (see FIG. 5).

The means 20, for the radial expansion of the sectors 18, comprise, for each sector 18 (see FIG. 6), two levers 23 and 24, a pilot shaft 25, and a mechanism for actuating the lever 26.

The two levers 23 and 24, are oriented to cross, one over the other, and they are disposed in planes that are radial to the drum. The levers have first ends 27–28 hinged to the extremities 29–30 of the relative sector 18, and second ends 31–32 that are actuable by the fluid-dynamic pistons 33–34 of the actuating mechanism.

The pilot shaft 25, is extended radially to the auxiliary drum and comprises an upper end 35 attached to the center of the relative sector, and a lower end 36 that is slidable in an internal position found at the center of the auxiliary drum.

There are also provided blocking means which are adjustable, for varying the degree of the expansion path for the sectors 18 of the relative belts in tires having measurements which are diverse to each other.

Figure 6:
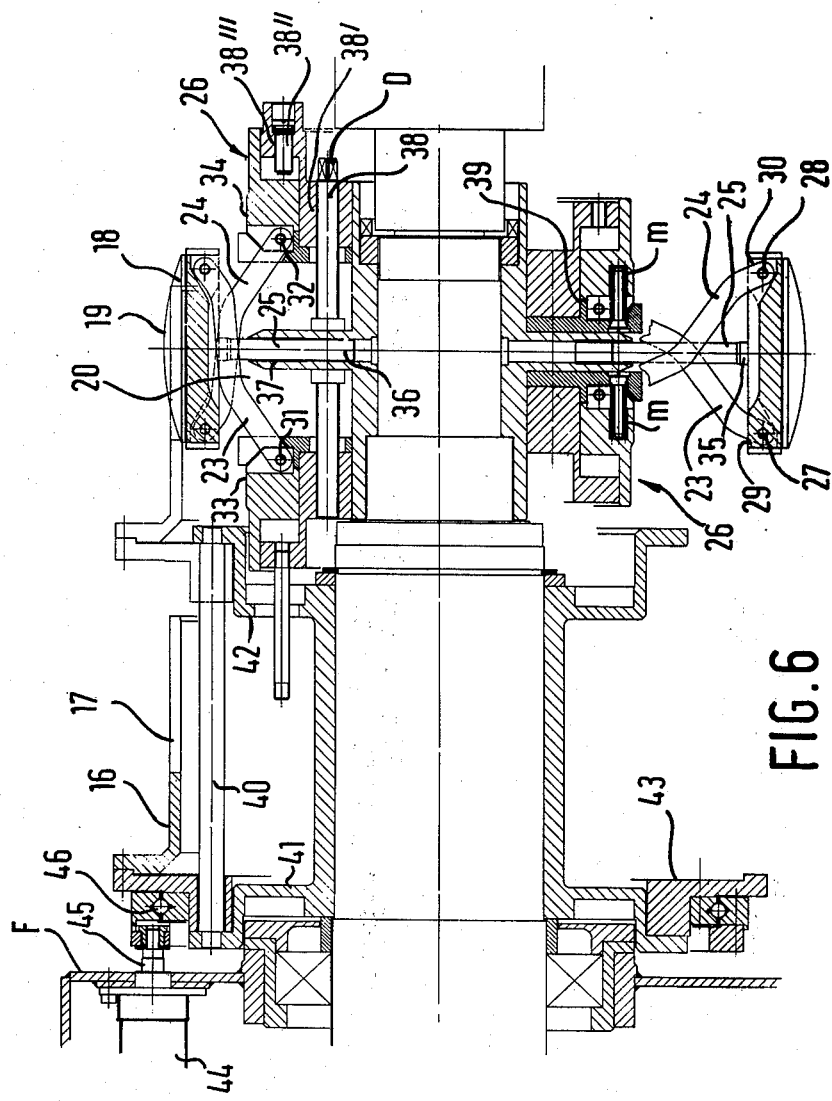
FIG. 6 is a cross-section of the sectors and of the means for expanding the sectors of the auxiliary drum.

With the aid of a special handle 'D', the rotation of the screw 28, in one sense or in the contrary sense, varies the initial reciprocal distances of the lever ends 31 and 32, and the successive path of the pistons, varies the degree of the expansion of the sectors 18, as is clearly shown in FIG. 6. In this Figure, in the upper part, there may be seen the minimum of the expansion travel of the sectors 18, depending upon a predetermined rotation of the screw; and in the lower part, may be seen the greatest expansion travel of the sectors 18 that abut against the stop-limit surface 39 by means of another predetermined rotation of screw 38.

The return movement of the sectors is also actuated by the special action of the cylindrical springs 'm' that are adapted for returning the ends 31–32 of the levers back to their original position when the actuating fluid is extracted from the relative cylinders.

The contraction of the sectors is also regulated by another screw 38"; the depth of the screw on a corresponding threaded surface 38''' of the drum determines the arresting of the lever ends, before the corresponding sector can proceed to interfere with the underlying profile of the teeth 17 in the comb 16.

Means adapted for withdrawing the comb 16 by sliding it off the relative teeth 17 and through the wells 22 of the sectors are provided on the auxiliary drum for completely expanded sectors 18.

These sliding means comprise (see FIG. 6) a plurality of horizontal guide-bars 40 connected to a first and a second plate (41 and 42) co-axial with the auxiliary drum; a third plate 43 mounted to slide over the guide-bars 40; a fluid-dynamic control, connected to the fixed structure 'F' and whose rod 45, is connected to the third plate 43 by means of the interposition of bearings 46 adapted for rotating on corresponding rolling tracts made directly on parts fast with the third plate and on the rod 45.

Comb 16 is fixed on the third mobile plate 43, co-axial to the auxiliary drum.

Figure 2:
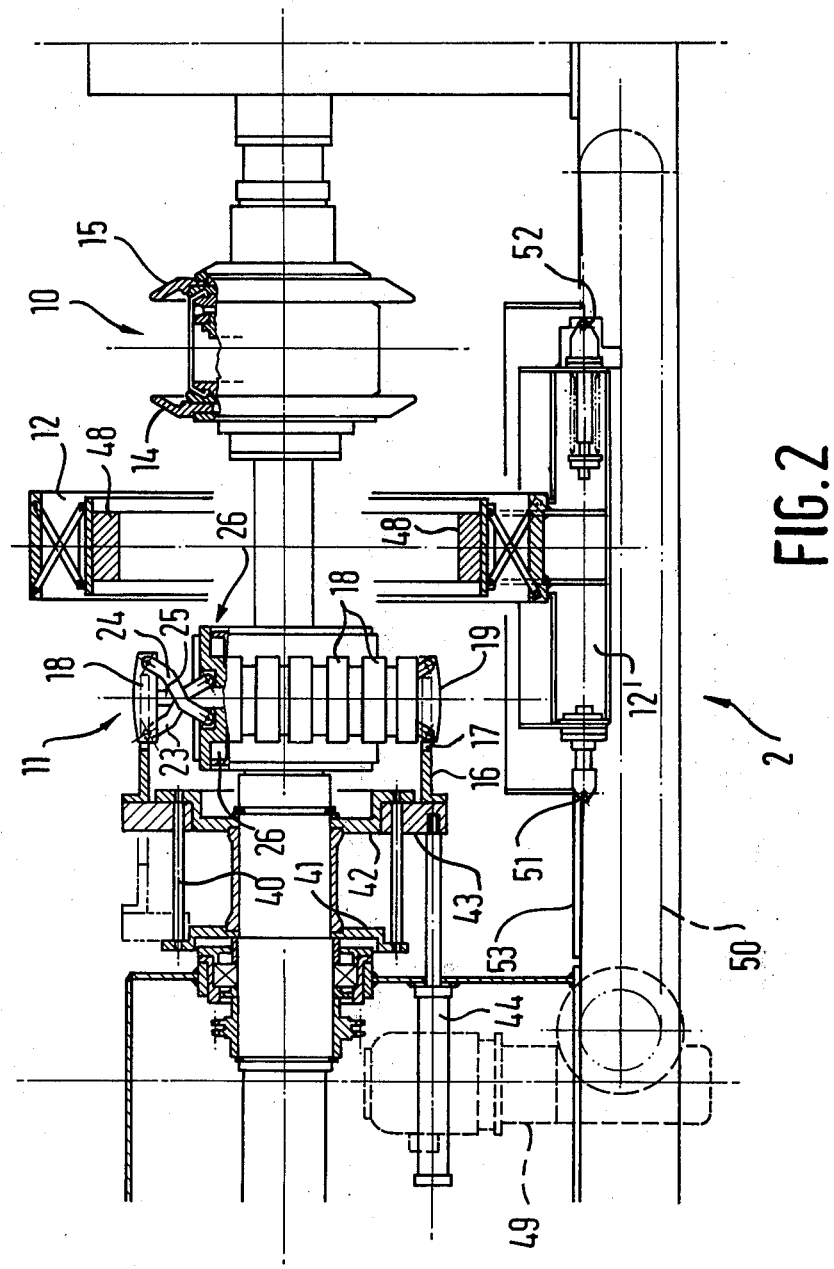
FIG. 2 is a longitudinal view of an embodiment of the apparatus provided for manufacturing the tire of FIG. 1.

When the auxiliary drum is in its steady state condition, after belt expansion, the return path of the rod 45, in its relative cylinder, carries along with it the third plate 43, and withdraws the comb 16 from the 'full-line' position to the 'broken-line' position of FIG. 2; or from the broken-line position to the full-line of FIG. 6.

The auxiliary drum 11, moreover, comprises means for temporarily blocking under pressure, the belt that is wound around the auxiliary drum.

In a preferred embodiment, the blocking means are magnetic means 47, forming additional supports (see FIG. 5) in the form of the teeth of comb 16.

The means 12 of apparatus 2, for transferring the annular layered-band formed by the reinforcing structure and by the tread, from the auxiliary drum to the main drum 10, comprise a transfer ring of the commonly 'known' type, provided with a plurality of sectors 48 that are actuatable through the means of opportune levering mechanisms in such a way as to permit them to contract radially for drawing any annular shaped element; and also to expand for returning to the at-rest position and for releasing the same element.

The movement of the rings 12 between the two drums, is regulated by the actuating system that comprises a motor 49 (see FIG. 2) with a chain 50 wherein the ends 51-52 are connected to a supporting base 12' of the ring, which is slidable on an appropriate rail 53.

The centering of the ring, with respect to the mid-plane of the main drum, is regulated by an extremely precise control-system based substantially (even though with a simplier solution) on the concept of the device described in the Italian Pat. No. 29324 A/76 and corresponding U.S. Pat. No. 4,131,402 assigned to the assignee of this application.

According to the scheme illustrated in FIG. 2, the auxiliary drum and the main drum are disposed on a common shaft, and the two drums are actuated in rotation independently one from the other, with the usual friction type mechanisms that are associated to various gears for changing the relative velocity, according to what is required for the single operation to be effected.

The transfer ring, in its turn, moves with its axis aligned with the drum axis. The functioning of the apparatus is as follows:

At the beginning of the manufacturing cycle, the carcass, already formed into the shape of a cylinder 'M' (see FIG. 3) is fitted onto the main drum 10.

For carrying out this operation, one of the two C-rings (14-15), is drawn apart in the direction of the axis of the main drum 10, and thence, after inserting sleeve 'M', the same C-ring is returned to a position for blocking the bead.

In a further step, always on the main drum 10, fluid under pressure is sent to the inside of the drum cavity, in this way bringing about the expansion of the elastic membrane 'B' and the consequent toroidal shaping of the carcass 'M' (FIG. 7) with a diameter that results in being substantially coincident with the diameter of the cylindrical surface of the comb 16.

Figures 4, 5:
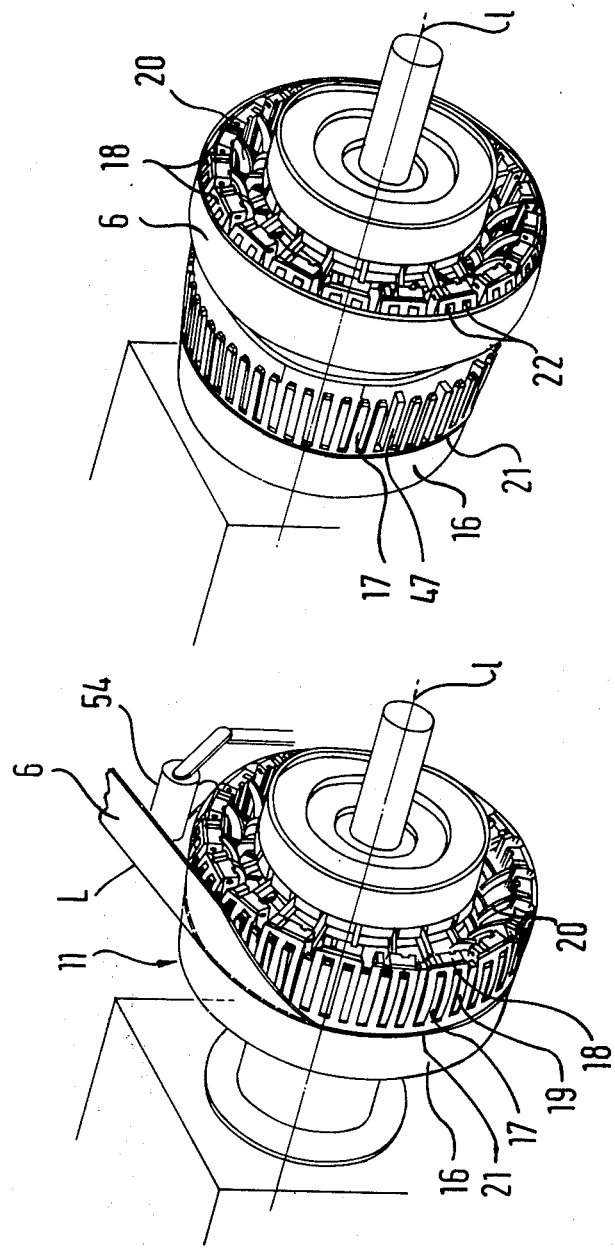
FIG. 4 represents, in detail, a perspective view of the auxialiary drum of the apparatus.
FIG. 5 represents the auxiliary drum of FIG. 4 after the toroidal shaping of the belt.

Substantially simultaneously, either a little while before, or a little while after the said operations, there takes place (successively) the winding of the first and second plies over the auxiliary drum 11 (see FIG. 4).

Each of these reinforcing plies is slowly directed to the auxiliary drum put into rotation, while always maintaining one of the sides 'L' of each ply in contact with the drum ridge 21, in such a way as to guarantee the exact alignment of the belt with respect to the mid-plane of the auxiliary drum.

During this phase, the plies adhere, for their entire width, to the comb 16, through means of 'attraction', to which the metallic ply cords are subjected due to the presence of magnents 47 inserted for part of the arc of the teeth 17.

For the purpose of winding each ply, it is necessary to proceed by overlapping the ends, and by effecting the relative joining, thus obtaining an annular belt having an internal diameter that corresponds with the external diameter of the carcass, after the first shaping step.

Before expanding the belt, the operation of compacting (or stitching) the two reinforcing plies, takes place.

The stitching operation is advantageous to insure the desired optimum uniform distribution of the metallic cords.

In fact, this 'compacting' results in having adhesion between the two plies—through the elimination of any interposition of air between the plies themselves. In this way, during the subsequent expanding of the belt, any slipping of one ply with respect to the other is prevented, and hence, the risk that free movement in the setting of the cords in the innermost ply might be held-up or altered by the relative shifting of the upper ply is eliminated.

Preferably, the 'compacting' action is carried out with cylindrical brushes 54 (FIG. 4) composed of filaments of a synthetic material, drawn close-to, and then brought under pressure onto the belt itself.

This brush action, is particularly favorable because (although it has sufficient mechanical action for allowing the air entrapped between the two plies, to escape) it has, owing to its construction with synthetic filaments, a force of impact that does not deform the belt, and neither does it alter the alignment of the belt, with respect to the mid-plane of the auxiliary drum.

Once this 'compacting' step is completed, the belt expansion takes place through the following sequence.

The fluid under pressure, is sent into the pistons 33-34 (see FIG. 6) of the actuating mechanism on the auxiliary drum in such a way as to draw the ends 31-32 of the levers 23-24, closer together, and to determine the raising of each of the sectors 18.

The sectors 18 expand progressively, starting from their initial position below the comb 16 (FIG. 4) with a radial shifting that is perfectly regulated by the presence of the pilot shaft 25 that is compelled to slide into the drum brushing 37 (FIG. 6).

Therefore, during the raising of the sectors, from the position of FIG. 4 to that of FIG. 5, alignment is guaranteed, with continuity between the wells of the teeth 17 which determine in this manner a rigorous and complete penetration between comb and the convexed surface 19 of the sectors, until the convexed surfaces (of all the sectors) are brought radially to a position above the comb.

Hence, there is obtained, with this step, the gradual passage of the auxiliary drum from a cylindrical configuration to a toroidal one and consequently, the belt expands between these two configurations, in a state of free slidability, into contact with the metallic surface 19 of the sectors 18.

The state of slidability between the innermost ply of the reinforcement and the metallic material surface of the sectors is further favored by the characteristic of expanding the belt by means of a plurality of convexed surfaces separated by void spaces, and determined by the presence of the comb 'teeth'.

As a matter of fact, with this solution during the expansion step, these void spaces act similarly to canals adapted for permitting the escape of entrapped air, that has been 'sucked in' in the course of the movement between sectors and inner ply; thus, any eventual effect of being held back or attached to the said inner ply attaching onto the sectors, is practically eliminated.

The finished result, is a nonrestrained setting of the metallic cords, with the absence of any hindrance to their movement either above or below, during the belt expansion; and finally, the cords are distributed with the maximum of uniformity possible and in a manner that has never been obtained in the past.

At the termination of the discussed expansion step, the auxiliary drum 11 and the belt 6 are found in the condition that is illustrated in FIG. 5, i.e. a toroidal configuration, with the maximum diameter of the belt larger than the diameter of the carcass, after the first toroidal configuration on the main drum.

In the same FIG. 6, there is represented the comb 16 withdrawn axially, and at a side with respect to the sectors after the various functions of the cylindrical support of the auxiliary drum, have ceased.

Successively, there takes place the step of transferring the annular layered-band from the auxiliary drum to the main drum 10. First, the ring 12 (FIG. 2) is transported, from its at-rest position towards the auxiliary drum until it is brought to the mid-plane in a centered position with regard to the annular layered-band; then, the sectors of the ring 12 are contracted together for bringing them into close contact with the central circular portion of the tread, and successively, the sectors 18 of the auxiliary drum contract in such a manner, that the annular layered band becomes solid with just the transfer ring; finally, the ring 12 is shifted in the direction of the axis that is common to the two drums, up to the mid-plane of carcass 3 that is obtained in the first toroidal shaping on the main drum 10 (FIG. 7).

Now, the further expansion of the carcass begins. This step is carried out once again with fluid under pressure inside of the membrane 'B' until the carcass 3 is transported from the first toroidal configuration (FIG. 7) to the second configuration, wherein the carcass crown coincides with the corresponding internal surface of the belt 6.

At the termination of this second shaping step, expansion of the sectors of the transfer ring 12, is effected—and hence, the drawing apart of the same ring from its at-rest position of FIG. 2.

Immediately after this, on the main (or basic) drum 10, the usual rolling operations take place by means of metallic discs (not illustrated), following dispositions and sequence that are already per se 'known'.

At the end of the rolling step, the tread is approached and compacted even at the ends of the underlying carcass; and the finished tire is in the condition illustrated in FIG. 8, with the equatorial development of the carcass slightly smaller than what it will assume in the vulcanizing step. During the vulcanizing step, the tire that was already subjected previously to an equatorial lengthening of the carcass during its passage from the first to the second toroidal shaping step, is now subjected to a further equatorial lengthening in its passage from the second toroidal shaping step to the vulcanized tire and with consequent, further expansion of the reinforcing structure and the molding of the tire band.

The plant 2 has been described according to a preferred embodiment; therefore, it is quite clearly comprehensible that certain of the elements can also be varied. For example, the cylindrical surface of the auxiliary drum 11 instead of having a comb form, can also comprise a plurality of sectors, the upper surfaces of which determine a cylindrical supporting surface for the belt.

These sectors can be shifted radially towards the outside, and regulated with a predetermined path for the purpose of adapting the sectors for supporting the belts relative to tires having diverse measurements.

Subsequent to the expanding of the belt, by means of the convex sectors, the cylindrical sectors can be contracted radially by shifting them. This nevertheless, will not at all interfere in any way, with the belt ends regardless of the tire size.

Moreover, the main drum can be structurally different from the one described. For example, a drum adapted for receiving the radial plies of the carcass, and for constructing them first into a cylindrical conformation having the form of a sleeve, and then, into the two successive toroidal conformations can be used.

Also the building drum may be one wherein the function of the expansible membrane is effected by the very same carcass, to the interior of which, fluid under pressure is directly introduced.

Although the invention has been described in detail for the purposes of illustration, it is to be understood that such detail is solely for the purpose of illustration and that variations can be made therein without departing from the spirit and scope of the invention except as it may be limited by the claims.

What is claimed is:

1. In a process for manufacturing radial tires for a motor vehicle having a radial carcass, a reinforcing structure with at least two layers of metallic cords forming a belt, the cords of adjacent layers being crisscrossed with respect to each other, and symmetrically oriented with respect to the longitudinal direction of the tire, and a tread, the said process comprising the steps of:

(a) building-up a carcass in a cylindrical configuration, on an expandable main tire building-drum;
(b) shaping the said carcass in its non-vulcanized state, into a toroidal configuration,
(c) winding two layers of metallic cords on an auxialiary drum having an expandable part and a diameter equal to the external diameter of the carcass after the toroidal configuration (b) thereof on the main building-drum to form a cylindrically shaped belt;
(d) expanding the expandable part of the said auxiliary drum, and maintaining the said belt in a slidable condition on said expandable part of the auxliary drum, converting the belt from its first cylindrical configuration to a toroidal configuration with an equatorial development which is larger than the equatorial development of the carcass after the shaping step (b);

(e) winding an elastomeric band from which a tread band is formed on the toroidal shaped belt formed in (d);

(f) contracting the auxiliary drum;

(g) removing from the contracted auxiliary drum, the annular layered-band comprising the belt and the tread band, (h) transferring and centering said annular layered-band with the equatorial plane of the carcass on the main drum;

(i) expanding the main drum, and shaping the carcass into a second toroidal configuration until the carcass crown is brought into contact with the corresponding toroidal surface of the belt; and (j) vulcanizing the so-formed tire in a mold under pressure.

2. A drum for separately shaping a reinforcing belt and a tread band for assembly with a radial carcass in the manufacture of a tire for a motor vehicle, said drum comprising means for expansion thereof and for transforming said belt from a cylindrical configuration into a toroidal configuration, said means having a surface over which said belt will slide when transformed from a cylindrical configuration into a toroidal configuration, said means comprising a plurality of comb shaped support members disposed circumferentially and parallel to the drum axis with void spaces interposed therebetween, a plurality of convex sectors with a total convex surface disposed below the upper surface of said support members in the cylindrical configuration of the said drum, and means for passing the sectors between the said void spaces and for expanding the sectors to a position above the said support members for imparting a toroidal configuration to the auxiliary drum.

3. The drum of claim 2 wherein said surface of said means for expansion has a coefficient of friction equal to that of a metal.

4. The process of claim 1 comprising after the step of expanding the auxiliary drum, the further successive step of applying and winding on the already expanded belt, at least one layer of cords which are parallel to each other and disposed in the longitudinal direction, said cords being comprised of a metallic or textile material that shrinks in length when heated, and finally winding the tread for originating the annular layered-band that has to be transferred to the main drum.

5. The process, of claim 1 or 4 comprising the step of centering the belt on the auxiliary drum by winding the belt in a cylindrical configuration while maintaining one side in contract with a circular ridge adapted to act as a reference on the auxiliary drum.

6. The process of claim 1 or 4 comprising the step of stitching the belt with a synthetic thread before expanding the belt.

7. The auxiliary drum of claim 2 wherein said means adapted for assuming a configuration and for making the auxiliary drum pass from a cylindrical configuration to a toroidal one comprises a plurality of supports disposed circumferentially and parallel to the drum axis with void spaces interposed therebetween, a plurality of convexed sectors comprising the expandable part of the said means with a total convexed surface disposed below the upper surface of said supports in the cylindrical configuration of the auxiliary drum, means for the passage of the sectors between the said void spaces and for the expansion of the sectors to a position above the said supports for determining the toroidal configuration of the auxiliary drum.

8. The auxiliary drum of claim 7, wherein said plurality of supports constitutes a comb-shaped supporting structure.

9. The auxiliary drum of claim 8, wherein the said expandable convexed sectors disposed below the comb-shaped supports comprise on the convexed part, longitudinal wells corresponding to the comb's teeth, each said well having a depth measured radially to the drum between the innermost surface of the tooth and the bottom of the relative well in its at-rest position at least equal to the radial shifting of the sectors for passing from the first position below the comb, to the upper position that is coincedent with the toroidal configuration of the auxiliary drum wherein the comb is lodged in the said wells and axially extractable from the wells in the absence of contact with the extremities of the already expanded belt.

10. The auxiliary drum of claim 8 or 9 wherein said comb constitutes at least one-half of the total cylindrical surface corresponding to the cylindrical configuration of the auxiliary drum.

11. The auxiliary drum of claim 7, 8, or 9 wherein the sectors are made of steel or of aluminium, at least in the upper convexed-surface.

12. The auxiliary drum of claim 7, 8 or 9, characterized by the fact that the sectors comprise scoring on the convex surface.

13. The auxiliary drum of claim 7 wherein the said means for the radial expansion of the sectors, comprise for each sector two levers, a pilot shaft, and an actuating mechanism, said levers being criss-crossed over each other, with the first ends hinged to the ends of the sector, and the second ends associated with fluid-dynamic pistons of the said mechanism, said pistons being slidable in a direction parallel to the auxiliary drum axis, said pilot shaft that is extended in a direction radial to the drum, comprising an upper-end rigidly connected to the center of the sector and a lower-end that is slidable in a bushing of the drum and controllable blocking means for limiting the radial shifting of the sectors.

14. The auxiliary drum of claim 13, wherein the said blocking means comprise a screw, the ends of which are threaded in opposite directions, said screw being threadably fixed in corresponding threaded surface associated with the lower extremities of the levers, and in such a way that the rotation of the said screw in one direction or the other, transforms the initial reciprocal distance of the lower ends of the said levers, and the subsequent path of the pistons varies the expansion range of the sectors.

15. The auxiliary drum of claim 7 comprising sliding means for said plurality of supports, with respect to the said sectors.

16. The auxiliary drum of claim 15, wherein said sliding means comprise a plurality of horizontal guide-bars connected to a first and a second plate co-axial to the auxiliary drum, a third plate mounted to slide on the guide-bars, a fluid-dynamic command connected to an appropriate fixed framework of the drum, and with the rod of it connected to the third plate through the interposition of bearings adapted for rotating on corresponding rolling tracks made directly on parts fixed to the third plate, and with the rod, said third mobile plate being fixed to said plurality of supports.

17. The auxiliary drum of claim 2 comprising means for temporarily blocking under pressure the belt in the winding step onto the auxiliary drum, said means being disposed between the said supports.

18. An auxiliary drum, as in claim 17 wherein said means for associating the belt under pressure comprise further supports for the belt made out of a magnetic material.

19. The auxiliary drum, of claim 2 comprising means for centering the belt that is being wound onto the auxiliary drum in rotation.

20. An auxiliary drum, as in claim 19, wherein said means comprise a circular ridge defined substantially on a plane orthogonal to the axis of the auxiliary drum.

21. A plant for manufacturing radial tires, comprising a radial carcass, a reinforcing structure comprised by at least two layers of metallic cords criss-crossed one with the other for forming the belt and the tread, said plant being characterized by the fact of comprising a main expandable tire building drum for shaping the carcass from a cylindrical configuration to a first toroidal shape, and then to a subsequent toroidal shape having a higher value than the first shape, said auxiliary expandable drum having the structure of claim 25 and being adapted for changing a configuration from cylindrical to toroidal, for changing the said layers of metallic cords from a cylindrical configuration to a toroidal one corresponding to the configuration of the second shaping of the carcass, means for transferring the annular layered-band that is comprised by the reinforcing structure and by the tread, from said auxiliary drum onto said main drum after the first toroidal shaping of the carcass and prior to the second toroidal shaping of the same carcass.

22. A plant, as in claim 21, wherein said means for transferring said annular layered-band, comprise a ring having devices adapted for maintaining the annular layered-band in contact with the surface of the ring itself.

23. A plant, as in claim 22, wherein said devices of the ring are sectors.

24. A plant, as in claim 22, characterized by the fact that, the axes of the main drum, of the ring, and of the auxiliary drum, are all aligned.

25. In a process for manufacturing tires for a motor vehicle having a carcass, a reinforcing structure with metallic cords forming a belt, and a tread, the improvement which comprises
(a) building-up a carcass in a cylindrical configuration, on an expandable main tire building-drum;
(b) shaping the said carcass in its non-vulcanized state, into a toroidal configuration,
(c) winding metallic cords on an auxilliary drum having an expandable part and a diameter which is equal to the external diameter of the carcass after the toroidal configuration from step (b) on the main building-drum to form a cylindrically shaped belt;
(d) expanding the expandable part of the said auxiliary drum, and maintaining the said belt in a slidable condition on said expandable part of the auxilliary drum, converting the belt from its first cylindrical configuration to a toroidal configuration with an equatorial development which is larger than the equatorial development of the carcass after the shaping step (b);
(e) winding an elastomeric band from which a tread band is formed on the toroidal shaped belt formed in (d);
(f) contracting the auxiliary drum;
(g) removing from the contracted auxiliary drum, the annular layered-band comprising the belt and the tread band,
(h) transferring and centering said annular layered-band with the equatorial plane of the carcass on the main drum;
(i) expanding the main drum, and shaping the carcass into a second toroidal configuration until the carcass crown is brought into contact with the corresponding toroidal surface of the belt; and
(j) vulcanizing the so-formed tire in a mold under pressure.

* * * * *